US010175916B2

(12) United States Patent
Sonogi

(10) Patent No.: US 10,175,916 B2
(45) Date of Patent: Jan. 8, 2019

(54) IMAGE FORMING APPARATUS, INFORMATION PROCESSING METHOD, AND STORAGE MEDIUM

(71) Applicant: CANON KABUSHIKI KAISHA, Tokyo (JP)

(72) Inventor: Katsutoshi Sonogi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/154,806

(22) Filed: May 13, 2016

(65) Prior Publication Data

US 2016/0342369 A1 Nov. 24, 2016

(30) Foreign Application Priority Data

May 20, 2015 (JP) ................................. 2015-102833

(51) Int. Cl.
*G06F 3/12* (2006.01)
*H04N 1/00* (2006.01)

(52) U.S. Cl.
CPC .......... *G06F 3/1205* (2013.01); *G06F 3/1248* (2013.01); *G06F 3/1267* (2013.01); *H04N 1/0023* (2013.01); *H04N 2201/0094* (2013.01)

(58) Field of Classification Search
CPC ...... G06F 3/1285; G06F 3/1211; G06F 3/124; G06F 3/1258; G06F 3/1243; G06F 3/1282; G06F 3/1293; G06F 3/1296; H04N 1/00411; H04N 2201/0091; H04N 1/00031; H04N 1/00204; H04N 1/00233; H04N 1/00278

USPC ... 358/1.15, 1.13, 1.14, 1.16, 1.9, 3.06, 448, 358/1.1, 1.17, 1.18, 1.2, 3.28, 450, 453, 358/474, 505, 515, 518, 538, 540; 399/27, 106, 193, 21, 24, 25, 258, 28, 399/286, 379, 394, 82; 709/206, 224, 709/226, 229

See application file for complete search history.

(56) References Cited

U.S. PATENT DOCUMENTS

| 6,285,843 | B1 * | 9/2001 | Obata ................ H04N 1/32609 399/82 |
| 6,559,967 | B1 * | 5/2003 | Akiba ................ H04N 1/00411 358/1.13 |
| 7,215,436 | B2 * | 5/2007 | Hull .................. G06F 17/30017 358/1.15 |
| 7,769,636 | B1 * | 8/2010 | Kamiya ............. G06Q 30/0253 358/1.14 |
| 7,905,156 | B2 * | 3/2011 | Scott ........................ B66D 1/54 74/89.21 |
| 8,223,385 | B2 * | 7/2012 | Minhas ................... G06T 7/001 358/1.18 |
| 8,488,171 | B2 * | 7/2013 | Miyata .................. G06F 3/1211 358/1.13 |

(Continued)

FOREIGN PATENT DOCUMENTS

JP 2013-107257 A 6/2013

*Primary Examiner* — Negussie Worku
(74) *Attorney, Agent, or Firm* — Canon USA Inc., IP Division

(57) ABSTRACT

An image forming apparatus includes a determination unit that determines whether a break of copies exists based on a content of a data area in print data for reservation printing and an updating unit that, in a case where the determination unit determines that the break of copies exists, updates an attribute value in the print data.

11 Claims, 10 Drawing Sheets

(56) References Cited

U.S. PATENT DOCUMENTS

| | | | | |
|---|---|---|---|---|
| 8,520,233 B2* | 8/2013 | Matsunaga | B07C 5/3412 | 358/1.15 |
| 8,593,671 B2* | 11/2013 | Harrington | G06F 3/1222 | 358/1.13 |
| 8,654,408 B2* | 2/2014 | Kobashi | G06F 3/1205 | 358/1.18 |
| 8,823,975 B2* | 9/2014 | Uchida | G03G 15/5075 | 358/1.13 |
| 8,861,005 B2* | 10/2014 | Grosz | G06F 3/0484 | 358/1.1 |
| 8,902,157 B2* | 12/2014 | Kimura | H04N 1/00442 | 345/156 |
| 2002/0109743 A1* | 8/2002 | Yamaguchi | B41J 13/0036 | 347/16 |
| 2006/0017976 A1* | 1/2006 | Mori | G06K 15/02 | 358/1.18 |
| 2006/0274331 A1* | 12/2006 | Kawasaki | G06F 3/1213 | 358/1.1 |
| 2007/0036575 A1* | 2/2007 | Hamano | G03G 15/50 | 399/82 |
| 2009/0028437 A1* | 1/2009 | Hirohata | G06K 9/38 | 382/201 |
| 2009/0103130 A1* | 4/2009 | Hayashi | H04N 1/32122 | 358/1.15 |
| 2009/0237737 A1* | 9/2009 | Yamada | G06F 17/30899 | 358/1.18 |
| 2009/0245589 A1* | 10/2009 | Komoto | B41J 29/38 | 382/112 |
| 2009/0304409 A1* | 12/2009 | Matoba | H04N 1/00413 | 399/82 |
| 2010/0091323 A1* | 4/2010 | Sunada | B41J 13/106 | 358/1.15 |
| 2010/0321707 A1* | 12/2010 | Koga | G03G 15/50 | 358/1.5 |
| 2011/0058882 A1* | 3/2011 | Umeda | B41J 11/009 | 400/582 |
| 2011/0206434 A1* | 8/2011 | Akiyoshi | G03G 15/50 | 399/363 |
| 2011/0320297 A1* | 12/2011 | Takeuchi | G06Q 20/20 | 705/23 |
| 2012/0019852 A1* | 1/2012 | Ito | G06K 15/027 | 358/1.13 |
| 2012/0105881 A1* | 5/2012 | Fukaya | H04N 1/00031 | 358/1.9 |
| 2012/0287476 A1* | 11/2012 | Sonogi | H04N 1/40 | 358/3.01 |
| 2013/0114102 A1* | 5/2013 | Yamamoto | G06K 9/3216 | 358/1.14 |
| 2013/0141750 A1* | 6/2013 | Suzuki | G06K 15/408 | 358/1.14 |
| 2014/0168695 A1* | 6/2014 | Sonogi | G06K 15/1865 | 358/1.15 |
| 2015/0067484 A1* | 3/2015 | Sumio | G06F 3/04883 | 715/251 |
| 2015/0161492 A1* | 6/2015 | Saito | G06K 15/403 | 358/1.12 |
| 2015/0254029 A1* | 9/2015 | Maeda | G06F 3/1212 | 358/1.15 |
| 2016/0267366 A1* | 9/2016 | Yoneyama | H04N 1/00708 | |
| 2016/0269590 A1* | 9/2016 | Sonogi | G06F 3/1204 | |
| 2018/0012115 A1* | 1/2018 | Maeda | G06K 19/07749 | |

* cited by examiner

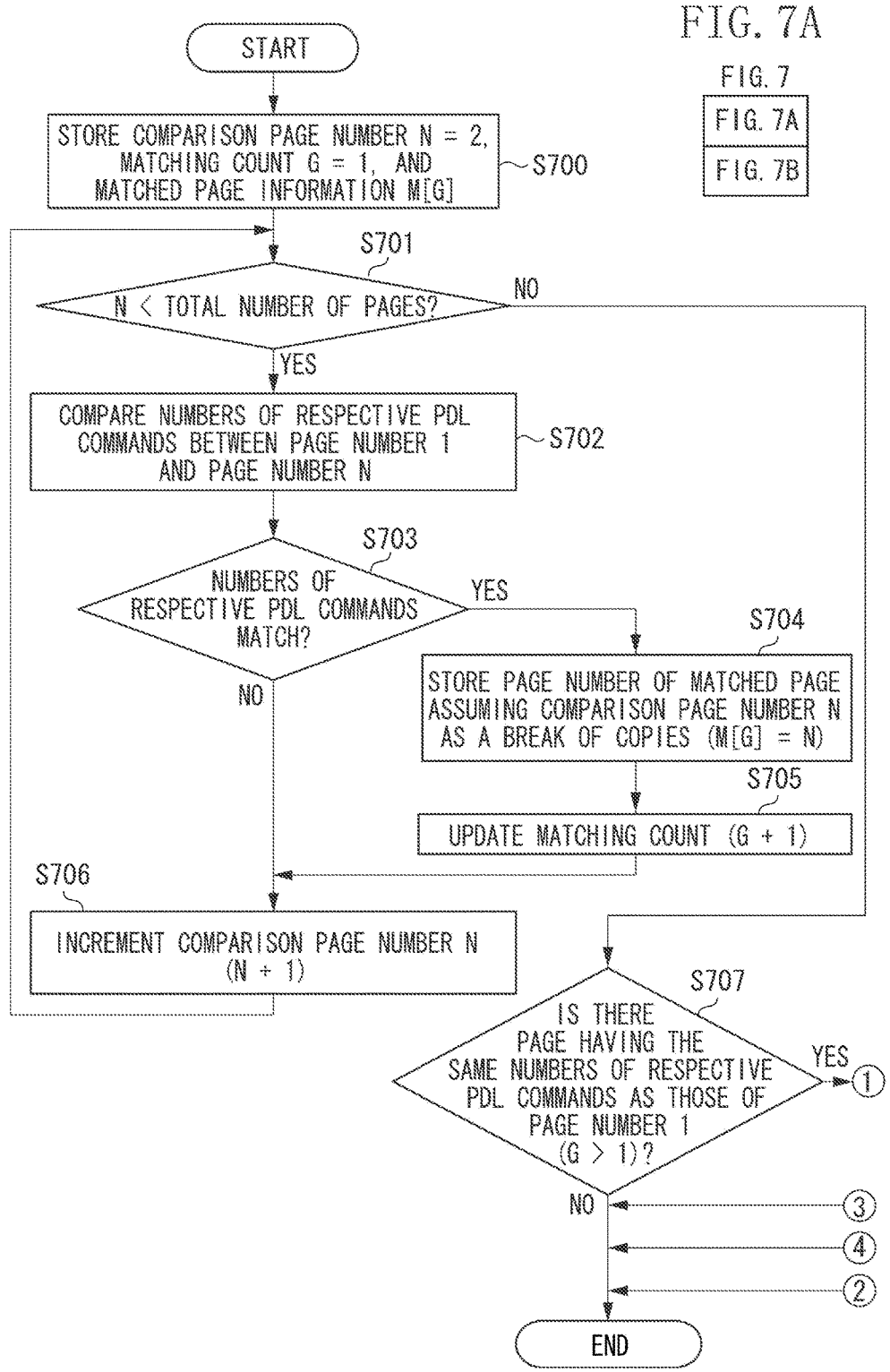

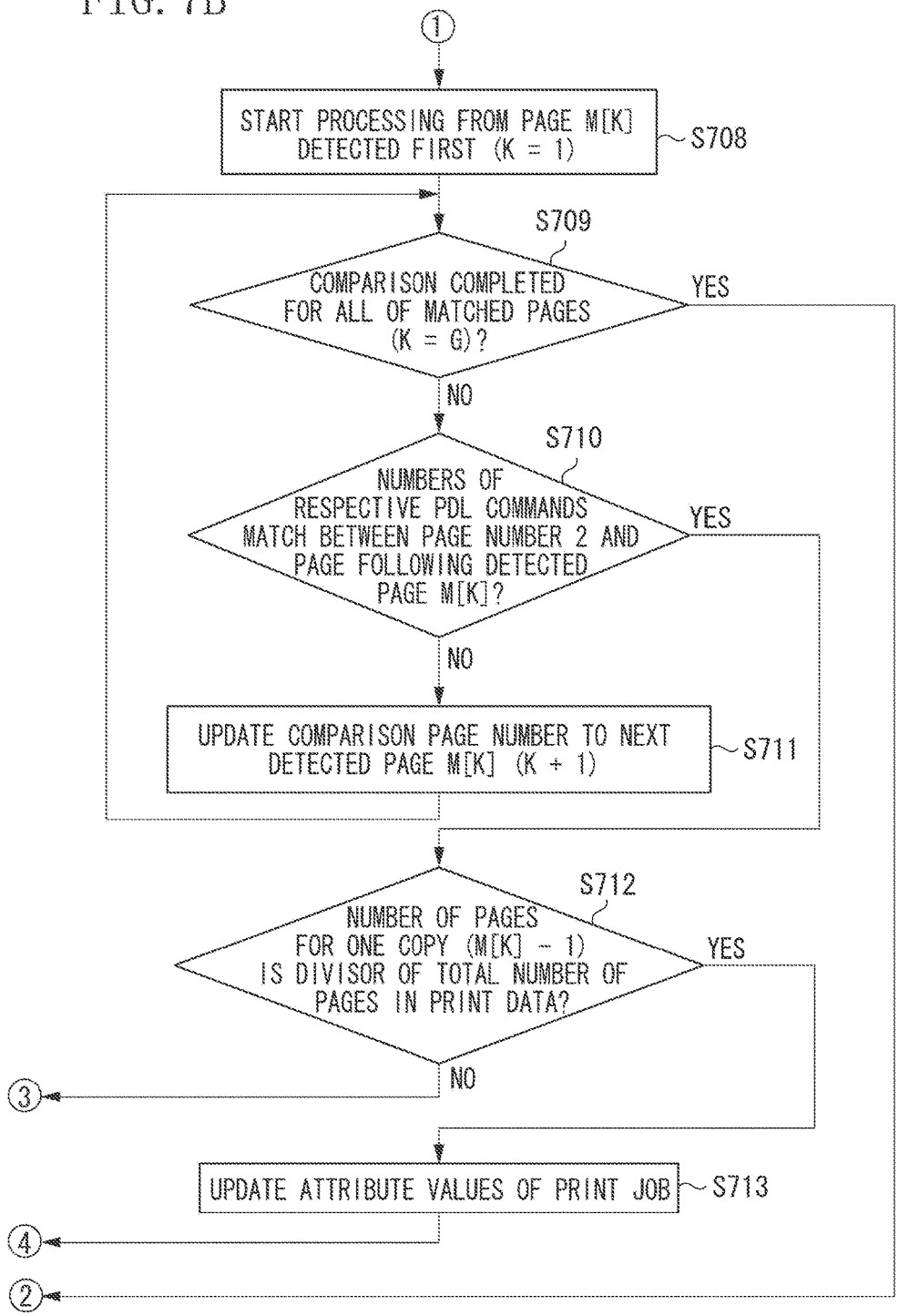

IMAGE FORMING APPARATUS, INFORMATION PROCESSING METHOD, AND STORAGE MEDIUM

BACKGROUND

Field

Aspects of the present invention generally relate to an image forming apparatus, an information processing method, and a storage medium.

Description of the Related Art

With the enhanced awareness of security and cost reduction in recent years, in certain print systems, an image forming apparatus stores print data and performs actual printing through user authentication (reservation printing). In such a system, there arises a time delay between a user instructing the image forming apparatus to perform printing from a host personal computer (PC) until the image forming apparatus actually performs user authentication and starts printing. Suppose, for example, there is a case where the number of members for a meeting increases or decreases during such a time delay. As a result, there arises a demand for increasing or decreasing the number of copies to be printed for print data with which the user has already instructed the image forming apparatus to perform printing. To meet this demand, some print systems allow a user to change the number of copies to be printed for print data stored in an image forming apparatus. The user is able to specify the number of copies when performing printing by using a printer driver from an application on a host PC. Specific applications and printer drivers process print data so that the number of copies to be printed becomes the number of copies specified by the user, and transmit the processed print data to the image forming apparatus. Since the print data has already been processed, the image forming apparatus does not need to perform printing taking the specified number of copies into consideration. However, for example, in a case where print data includes six pages processed by the printer driver, the image forming apparatus does not know whether the print data is intended to be printed as a single six-page document or as a two copy three-page document. For print data processed on the host PC side, the image forming apparatus does not know the number of pages for one copy as described above, and hence the number of copies cannot be correctly changed on the image forming apparatus side.

To address this, Japanese Patent Application Laid-Open No. 2013-107257 discusses a technique of previously adding the number of pages for one copy as an attribute value in print data on a host PC side to enable correct changing of the number of copies when the number of copies is changed on an image forming apparatus side.

When an application processes print data according to the number of copies, the number of pages for one copy may not be previously added as an attribute value in the print data. In other words, there is print data with which the number of copies cannot be correctly changed by a conventional technique. As a result, a user cannot subsequently modify print data for reservation printing as desired.

SUMMARY

Aspects of the present invention are directed to an image forming apparatus, an information processing method, and a storage medium that enable a user to change settings as desired, even for print data for reservation printing to which the number of pages for one copy is not added as an attribute value.

According to an aspect of the present invention, an image forming apparatus includes a determination unit configured to determine whether a break of copies exists based on a content of a data area in print data for reservation printing, and an updating unit configured to, in a case where the determination unit determines that the break of copies exists, update an attribute value in the print data.

Further features of aspects of the present invention will become apparent from the following description of exemplary embodiments with reference to the attached drawings.

BRIEF DESCRIPTION OF THE DRAWINGS

FIG. 7 (7A and 7B) is a flowchart illustrating an example of processing for determining a break of copies.

DESCRIPTION OF THE EMBODIMENTS

Exemplary embodiments of the present invention will be described below with reference to the accompanying drawings.

<System Configuration>

Figure 1:
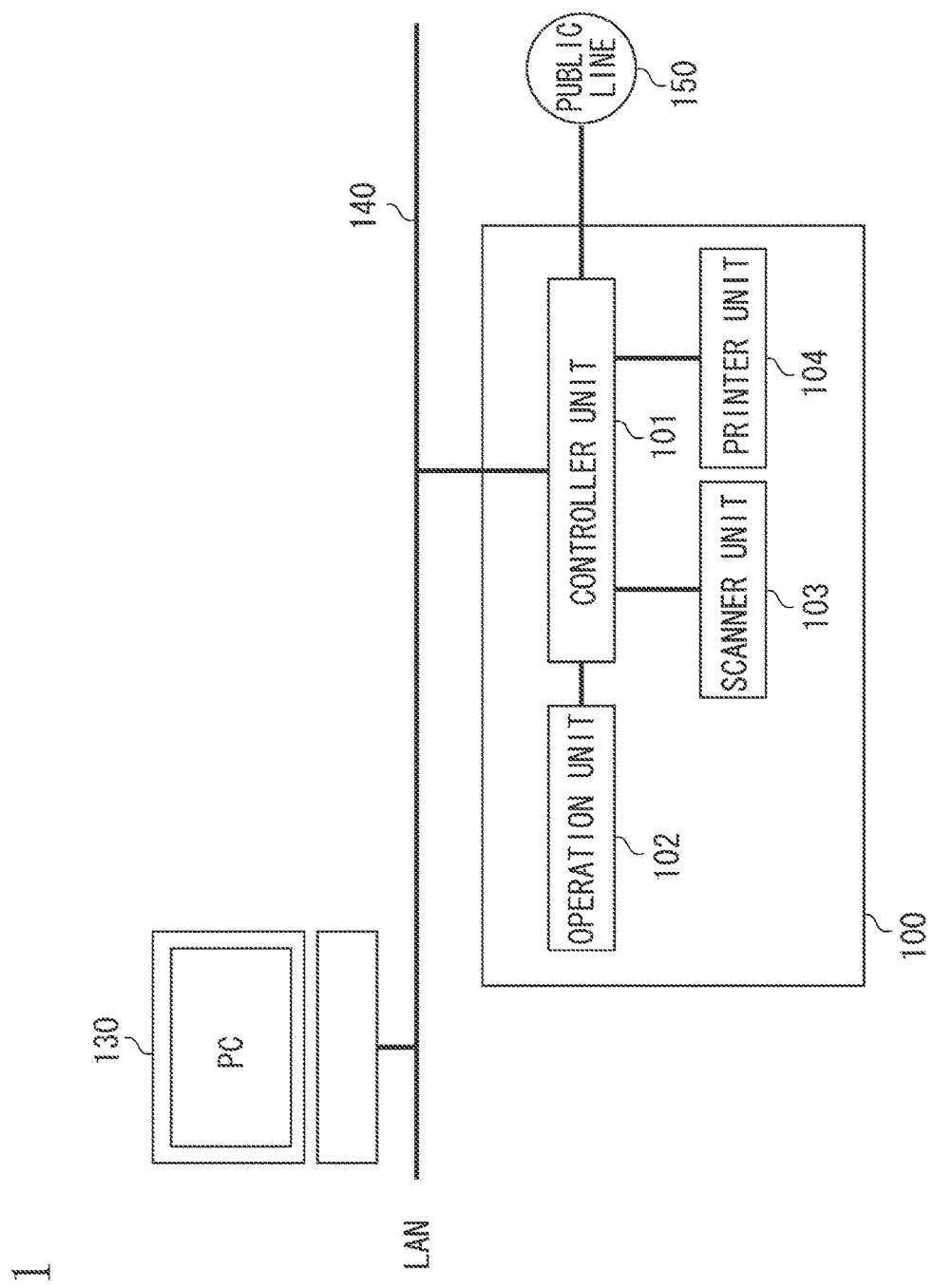
FIG. 1 illustrates an example of a configuration of an image processing system.

A first exemplary embodiment of the present invention will be described below. FIG. 1 illustrates an example of a configuration of an image processing system. In the image processing system, a personal computer (PC) 130 and an image forming apparatus 100 are connected to a local area network (LAN) 140. However, the number of connections is not limited to the number illustrated in FIG. 1. Although, in the present exemplary embodiment, a LAN is applied as a connection method, the connection method is not limited thereto. For example, an arbitrary network such as a wide area network (WAN) (public line 150), a serial transmission method such as Universal Serial Bus (USB), and a parallel transmission method such as Centronics and Small Computer System Interface (SCSI) are applicable.

The host computer (hereinafter referred to as the PC) 130 is provided with functions of a personal computer. The basic internal configuration thereof will be described below. The PC 130 includes a central processing unit (CPU), a random access memory (RAM), a read only memory (ROM), a hard disk drive (HDD), input devices such as a keyboard and a mouse, output devices such as a display unit, a network interface (I/F), and a chip set for controlling these hardware components. These components are mutually connected by an internal data bus. A basic input/output system (BIOS) and an operation system (OS) are operating as software for controlling these hardware components. The PC 130 is capable of transmitting and receiving files and E-mails by using File Transfer Protocol (FTP) and the Server Message Block (SMB) protocol via the LAN 140 or a WAN. The PC 130 is also capable of instructing the image forming apparatus 100 to perform printing via a printer driver.

The image forming apparatus 100 includes a scanner unit 103 as an image input device, a printer unit 104 as an image output device, a controller unit 101 for controlling operations of the entire image forming apparatus 100, and an operation unit 102 as a user interface (UI).

<Controller Unit Configuration>

Figure 2:
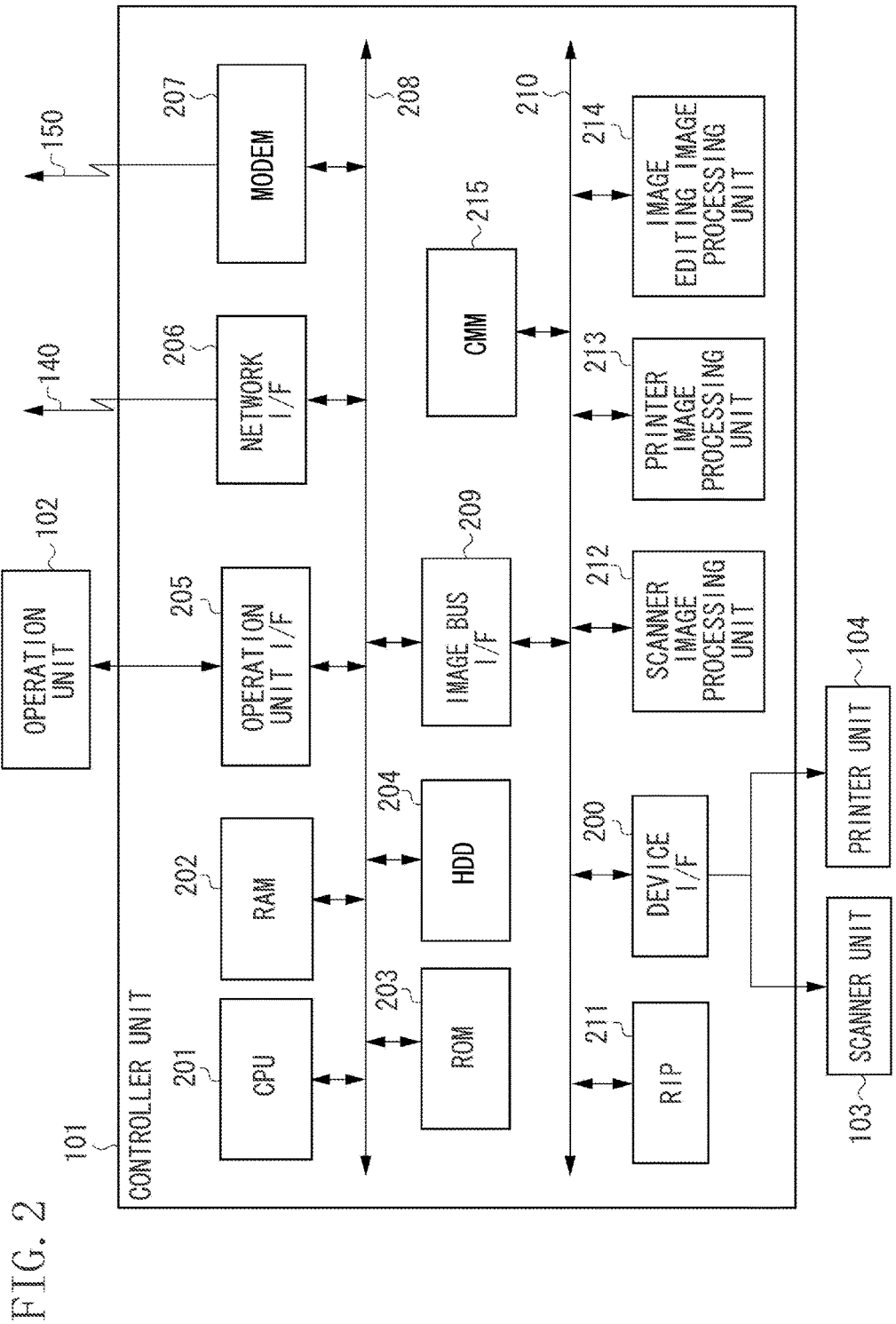
FIG. 2 illustrates an example of a hardware configuration of an image forming apparatus.

FIG. 2 illustrates an example of a hardware configuration of the image forming apparatus 100. Referring to FIG. 2, the controller unit 101 is connected with the scanner unit 103 as the image input device and the printer unit 104 as the image output device, and controls the scanner unit 103 and the printer unit 104 to read image data and output print data, respectively. The controller unit 101 is further connected with the LAN 140 and the public line 150, and performs control to input and output image information and device information via the LAN 140. The printer unit 104 is a printer engine to be connected with a device I/F 200, and performs processing for outputting drawing data generated by the controller unit 101 onto paper.

A CPU 201 is a central processing unit for controlling the entire image forming apparatus 100. A RAM 202 is a system work memory used by the CPU 201 to operate, and also serves as an image memory for temporarily storing input image data. A ROM 203 is a boot ROM storing a boot program of the system. An HDD 204 is a hard disk drive and stores system software for various processing and input image data. An operation unit I/F 205 is an interface unit for the operation unit 102 having a display screen on which image data can be displayed. The operation unit I/F 205 outputs operation screen data to the operation unit 102. The operation unit I/F 205 also has a role of transmitting to the CPU 201 information input via the operation unit 102 by an operator. A network interface 206 is implemented, for example, by a LAN card and is connected to the LAN 140, and inputs and outputs information from/to an external apparatus. A modem 207 is connected to the public line 150, and inputs and outputs information from/to an external apparatus. The above-described units are disposed on a system bus 208.

An image bus I/F 209 is an interface for connecting the system bus 208 and an image bus 210 for transferring image data at high speeds, and serves as a bus bridge for data structure conversion. A raster image processor (RIP) 211, the device I/F 200, a scanner image processing unit 212, a printer image processing unit 213, an image editing image processing unit 214, and a color management module (CMM) 215 are connected to the image bus 210.

The raster image processor (RIP) 211 rasterizes page description language (PDL) data codes and vector data (described below) into an image. The device I/F 200 connects the scanner unit 103 and the printer unit 104 with the controller unit 101, and performs synchronous/asynchronous conversion on image data.

The scanner image processing unit 212 performs various processing such as correction, processing, and editing on image data input from the scanner unit 103. The printer image processing unit 213 performs correction and resolution conversion processing corresponding to the printer engine on image data to be printed out. The image editing image processing unit 214 performs various image processing such as rotation and compression/decompression processing on image data. The CMM 215 is a hardware module dedicated for performing color conversion processing (also referred to as color space conversion processing) on image data based on a profile and calibration data. A profile refers to information like a function for converting color image data represented in an apparatus-dependent color space into an apparatus-independent color space (such as the Lab color space). The calibration data refers to data for correcting the color reproduction characteristics of the scanner unit 103 and the printer unit 104 in a color multifunction peripheral 3.

When the CPU 201 performs processing based on programs stored in the ROM 203 or HDD 204, the software configuration and flowcharts (described below) are implemented.

<Controller Software Configuration>

Figure 3:
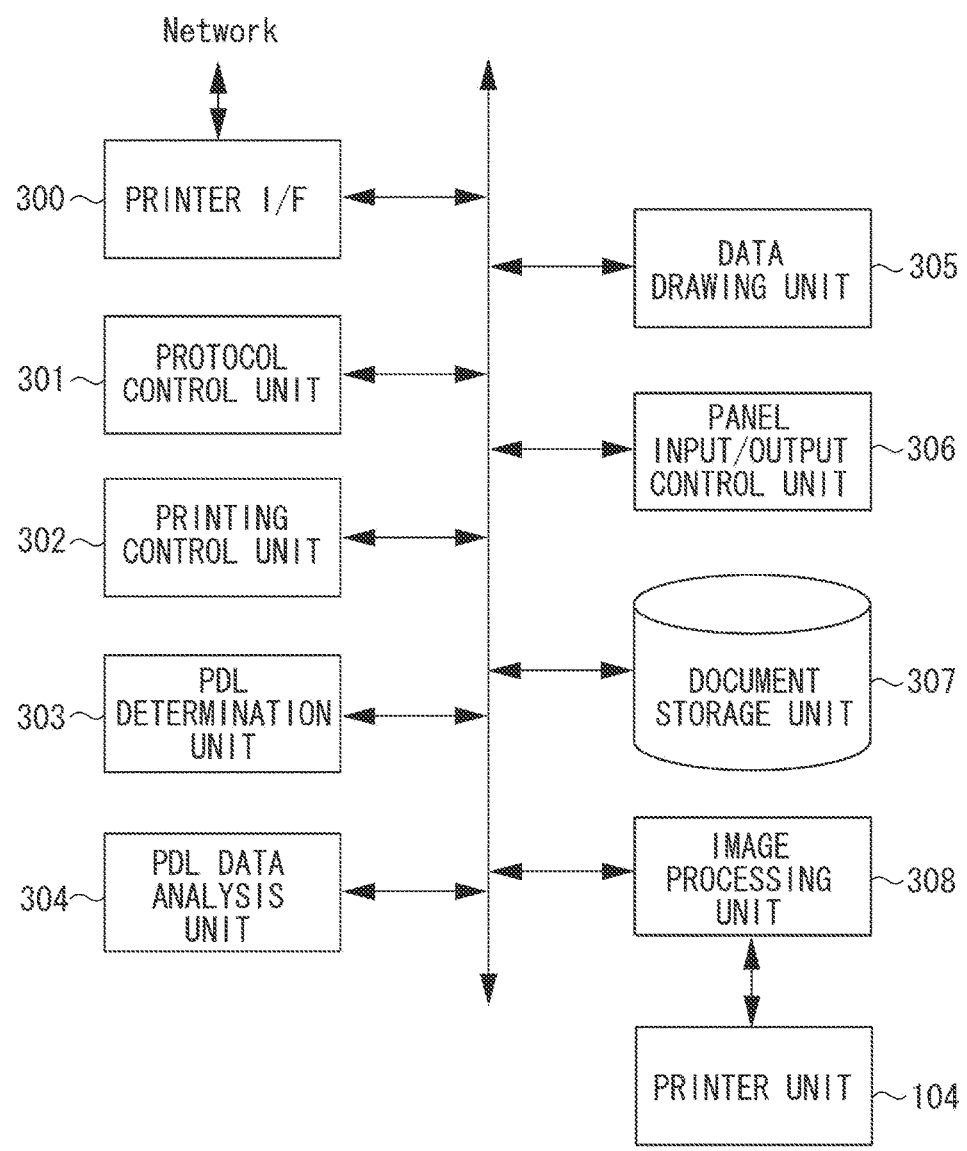
FIG. 3 illustrates an example of a software configuration of the image forming apparatus.

FIG. 3 illustrates an example of a software configuration of the image forming apparatus 100. A printer interface 300 controls input and output with an external apparatus via the network interface 206. A protocol control unit 301 performs communication with an external apparatus by analyzing and transmitting a network protocol. The printer interface 300 receives PDL data transmitted from an external network, and stores the PDL data in a document storage unit 307.

When the PDL data is stored in the document storage unit 307, a printing control unit 302 requests a PDL determination unit 303 and a PDL data analysis unit 304 to start processing.

The PDL determination unit 303 analyzes the PDL data according to an instruction of the printing control unit 302 to determine the types of PDL and file format. The PDL data analysis unit 304 analyzes the PDL data selected by the PDL determination unit 303, and converts it into intermediate data (display list) for each drawing command having a format which is easier to process. Example drawing commands include characters (text commands), figures (graphic commands), and photographs (image commands). The intermediate data generated by the PDL data analysis unit 304 is transferred to a data drawing unit 305 via the document storage unit 307 and then processed. The data drawing unit 305 generates bitmap data based on the intermediate data stored in the document storage unit 307. The generated bitmap data is successively stored in the document storage unit 307.

A panel input/output operation unit 306 controls input and output of the operation unit I/F 205 from/to the operation unit 102.

The document storage unit 307 stores data files containing PDL data and intermediate data on an input document job basis. The document storage unit 307 stores data files in secondary storage devices such as the RAM 202 and the HDD 204.

An image processing unit 308 reads from the document storage unit 307 bitmap data and attribute information generated by the data drawing unit 305, and then performs color space processing on the bitmap data via the CMM 215. After completion of the color space processing on the bitmap data, the image processing unit 308 transmits the processed data to the printer unit 104.

<Print Data Configuration>

Figure 4A:
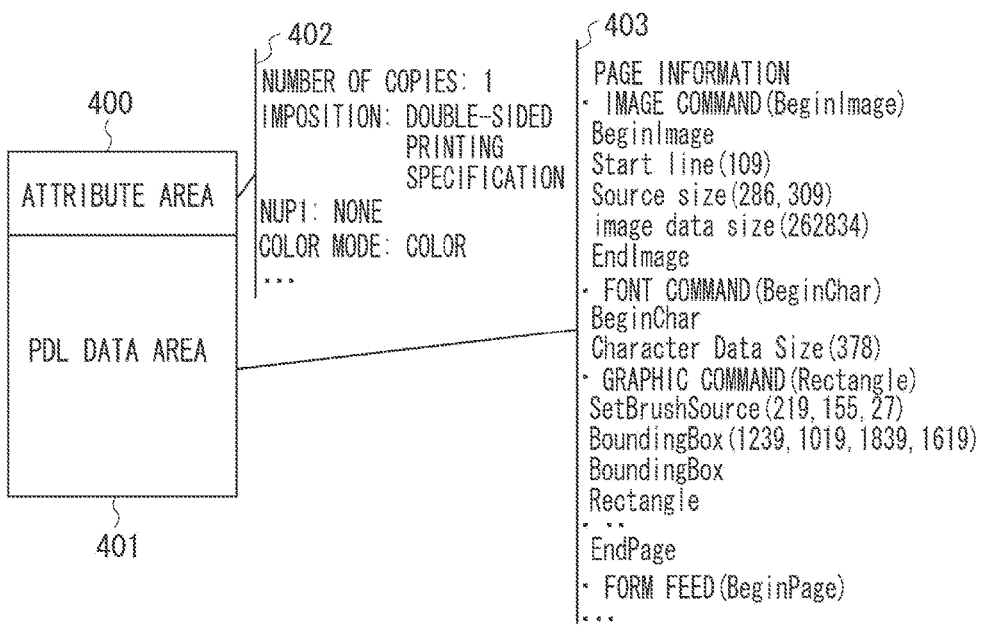
FIGS. 4A and 4B illustrate print data configurations.
Figure 4B:
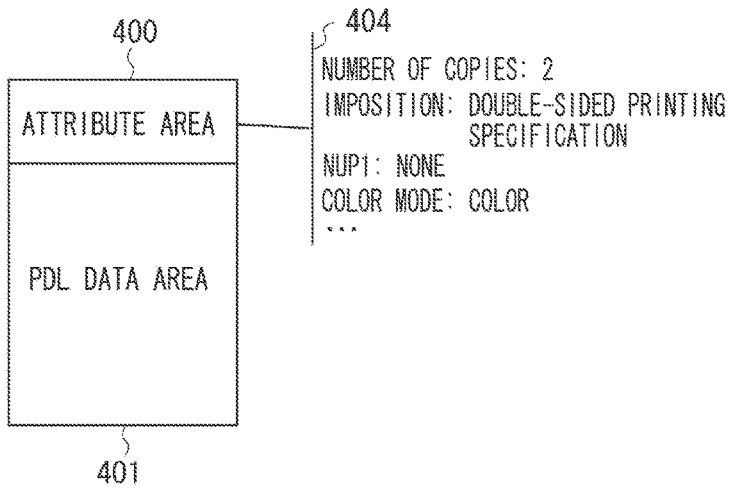

Configurations of print data used in the present exemplary embodiment will be described below with reference to FIGS. 4A and 4B. FIG. 4A illustrates print data configured by a non-collate function, and FIG. 4B illustrates print data configured by a collate function. The print data includes an attribute area 400 and a PDL data area 401. When a plurality of copies is specified, information about a plurality of the copies specified is added to attribute values of the print data configured by the collate function. On the other hand, even when a plurality of copies is specified, information about a plurality of the copies specified is not added to attribute values of the print data configured by the non-collate function. In the attribute area 400 illustrated in FIGS. 4A and 4B, detailed printing information of the print data (the number of copies, one-sided/double-sided printing specification, Nup print settings, color mode, etc.) are registered as attribute values 402. On the other hand, the PDL data area 401 includes PDL command data 403 of the print data. The PC 130 sets information about the number of copies specified by the user in the attribute area 400. In this case, when print data with the non-collate function is generated, a value 1 is set as the number of copies as in the attribute values 402 even if a plurality of copies is specified by the printer driver. When print data with the collate function is generated from the PC 130, a value other than 1 is set as the number of copies as in attribute values 404 illustrated in FIG. 4B.

The PDL command data 403 includes PDL commands such as an image command (BeginImage), a font command (BeginChar), and a graphic command (Rectangle). The PDL data analysis unit 304 can acquire each piece of information (data size, color value, etc.) from the information specified between the start (Begin) and an end (End) of each command. The PDL command data 403 illustrated in FIG. 4A indicates an example of information specified by each command. The present exemplary embodiment is not limited to this PDL type, and is applicable to print data of all PDL types. Since certain PDL print data does not pass through the printer driver, certain print data does not include the attribute values 402. The present exemplary embodiment will be described below centering on a method for enabling changing the number of copies also for print data not having the attribute area 400. The print data illustrated in FIGS. 4A and 4B is transmitted from the PC 130 to the image forming apparatus 100 via the LAN 140 and then stored in the HDD 204 of the image forming apparatus 100 via the network interface 206.

<Method for Determining a Break of Copies>

A method for determining a break of copies according to the present exemplary embodiment will be described below with reference to FIGS. 5 to 8A, 8B, and 8C.

Figure 5:
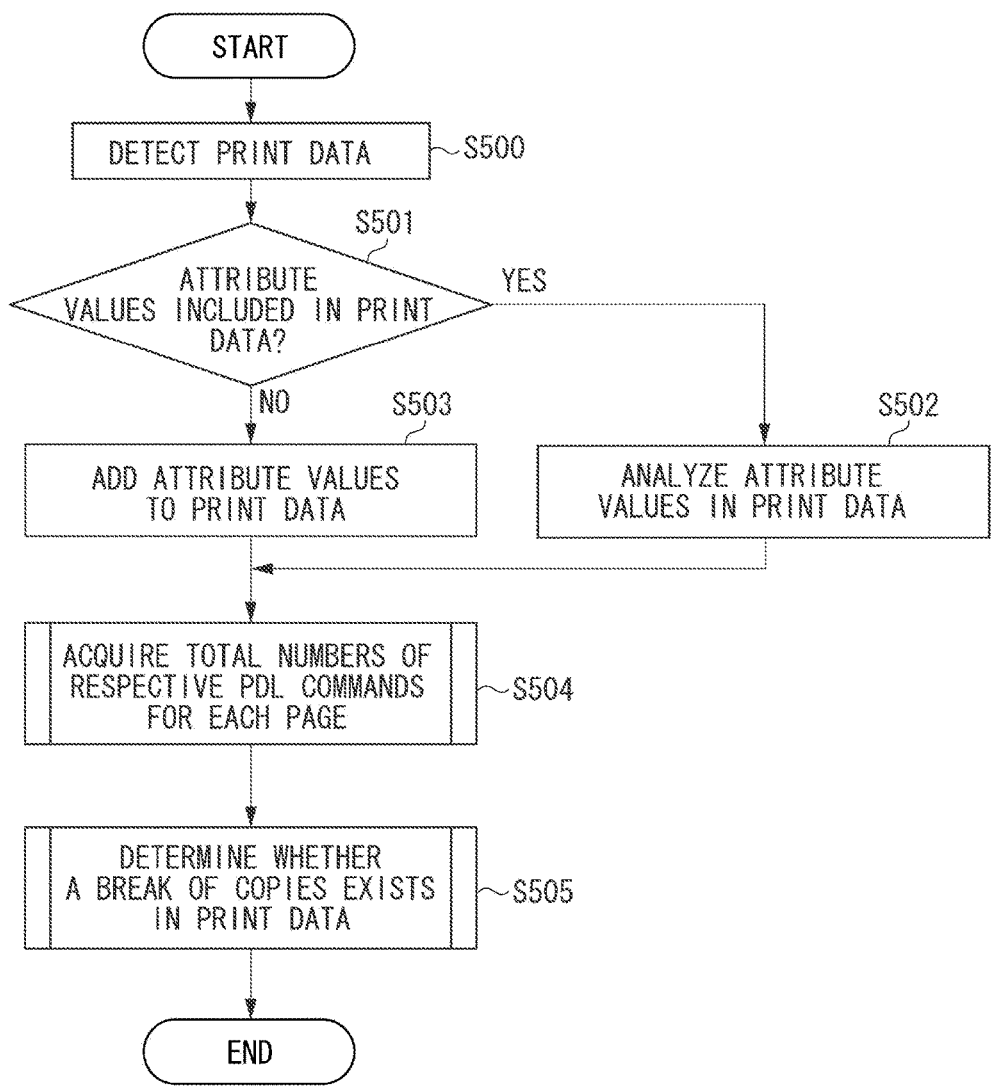
FIG. 5 is a flowchart illustrating an example of information processing according to a first exemplary embodiment.

FIG. 5 is a flowchart illustrating an example of information processing for determining whether the print data for reservation printing (see FIGS. 4A and 4B) input from the PC 130 to the image forming apparatus 100 is print data for one copy.

In step S500, the printing control unit 302 detects whether print data is stored in the HDD 204.

In step S501, the PDL data analysis unit 304 analyzes the PDL data based on the result of the determination by the PDL determination unit 303 to determine whether the attribute values 402 are included in the print data. When the PDL data analysis unit 304 determines that the print data includes the attribute values 402 (YES in step S501), the processing proceeds to step S502. On the other hand, when the PDL data analysis unit 304 determines that the print data does not include the attribute values 402 (NO in step S501), the processing proceeds to step S503.

In step S502, the PDL data analysis unit 304 analyzes the attribute values 402 in the print data determined by the PDL determination unit 303.

In step S503, the PDL data analysis unit 304 adds the attribute values 402 to the top of the print data. The PDL data analysis unit 304 sets the initial value of the number of copies to 1 in the attribute values 402 in the print data. Since there is no particular limitation on the rest of the attribute values 402, the PDL data analysis unit 304 may set the initial values of the rest of the attribute values 402 to the initial values prestored in the document storage unit 307 or set those values as specified by the user through a user operation via the operation unit 102.

In step S504, the PDL data analysis unit 304 acquires the total numbers of image commands, graphic commands, and font commands in the PDL command data 403 for each page in the print data. Images, graphics, and fonts are examples of objects.

A method for acquiring the total numbers of respective commands in the PDL command data 403 will be described below with reference to the flowchart illustrated in FIG. 6.

In step S600, the PDL data analysis unit 304 starts the analysis of the PDL commands from the first page (page number 1) to the last page (page number Z) in the PDL command data 403.

In step S601, the PDL data analysis unit 304 determines whether the analysis is completed for all pages in the print data. When the PDL data analysis unit 304 determines that the analysis is completed for all pages (YES in step S601), the processing proceeds to step S505. On the other hand, when the PDL data analysis unit 304 determines that the analysis is not yet completed for all pages (NO in step S601), the processing proceeds to step S602.

In step S602, the PDL data analysis unit 304 acquires a PDL command from the PDL command data 403. In steps S603 to S609, the PDL data analysis unit 304 performs processing for updating PDL command statistical information for respective PDL command types of the PDL command acquired in step S602. This processing will be described below.

In step S603, the PDL data analysis unit 304 determines whether the PDL command acquired in step S602 is an image command. When the PDL data analysis unit 304 determines that the PDL command is an image command (YES in step S603), the processing proceeds to step S604. On the other hand, when the PDL data analysis unit 304 determines that the PDL command is not an image command (NO in step S603), the processing proceeds to step S605.

In step S604, the PDL data analysis unit 304 acquires image attribute information from the PDL command data 403. Although, in the present exemplary embodiment, the attribute information acquired in step S604 is the number of PDL commands in which an image is specified, the attribute information is not limited thereto. For example, the image attribute information acquired by the PDL data analysis unit 304 may be information such as data size and image color value.

In step S605, the PDL data analysis unit 304 determines whether the PDL command acquired in step S602 is a graphic command. When the PDL data analysis unit 304 determines that the PDL command is a graphic command (YES in step S605), the processing proceeds to step S606. On the other hand, when the PDL data analysis unit 304 determines that the PDL command is not a graphic command (NO in step S605), the processing proceeds to step S607.

In step S606, the PDL data analysis unit 304 acquires graphic attribute information from the PDL command data 403. Although, in the present exemplary embodiment, the attribute information acquired in step S606 is the number of PDL commands in which a graphic is specified, the attribute information is not limited thereto. For example, the graphic attribute information acquired by the PDL data analysis unit 304 may be information such as data size and image color value.

In step S607, the PDL data analysis unit 304 determines whether the PDL command acquired in step S602 is a font command. When the PDL data analysis unit 304 determines that the PDL command is a font command (YES in step S607), the processing proceeds to step S608. On the other hand, when the PDL data analysis unit 304 determines that the PDL command is not a font command (NO in step S607), the processing proceeds to step S610.

In step S608, the PDL data analysis unit 304 acquires font attribute information from the PDL command data 403. Although, in the present exemplary embodiment, the attribute information acquired in step S608 is the number of PDL commands in which a font is specified, the attribute information is not limited thereto. For example, the font attribute information acquired by the PDL data analysis unit 304 may be information such as data size and image color value.

In step S609, the PDL data analysis unit 304 updates the total numbers of PDL command calls for respective PDL command types of the PDL command acquired from the PDL command data 403. Although, in the present exemplary embodiment, the number of PDL command calls is used as statistical information, the statistical information is not limited thereto. The PDL data analysis unit 304 may update the statistical information of the data size and the statistical information of the color values acquired from the PDL commands.

In step S610, the PDL data analysis unit 304 determines whether the analysis is completed for all of PDL commands in the page currently being analyzed (page number I). When the PDL data analysis unit 304 determines that the analysis is completed for all of the PDL commands (YES in step S610), the processing proceeds to step S611. The PDL data analysis unit 304 determines whether the analysis is completed for all of PDL commands based on whether the PDL command acquired in step S602 is the end of the current page (PageEnd). When the PDL data analysis unit 304 determines that the analysis is not completed for all of the PDL commands (NO in step S610), the processing returns to step S602. Then in step S602, the PDL data analysis unit 304 acquires the next PDL command data 403.

In step S611, the PDL data analysis unit 304 stores the PDL command count values for the current page (page number I) in the document storage unit 307, and then proceeds to analysis on the following page.

Subsequently, the PDL data analysis unit 304 performs the above-described processing in steps S601 to S611 on up to the end of the print data to acquire the statistical information of the PDL command data 403. PDL command statistical information 801 illustrated in FIG. 8A indicate the total numbers of respective commands for each page in the PDL command data 403, acquired by the PDL data analysis unit 304. The PDL data analysis unit 304 stores the acquired total numbers of respective PDL commands for each page in the document storage unit 307.

In step S505, the PDL data analysis unit 304 determines whether a break of copies exists in the print data based on the PDL data area 401 of the print data. The determination processing in step S505 will be described below with reference to the flowchart illustrated in FIG. 7 (7A and 7B).

Figure 8A:
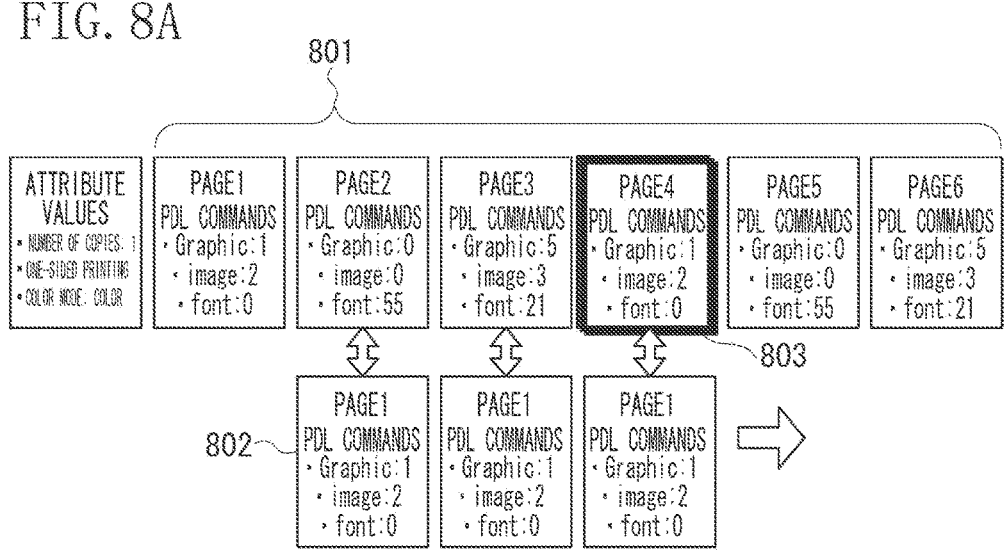
FIGS. 8A, 8B, and 8C illustrate processing for determining a break of copies.
Figure 8B:
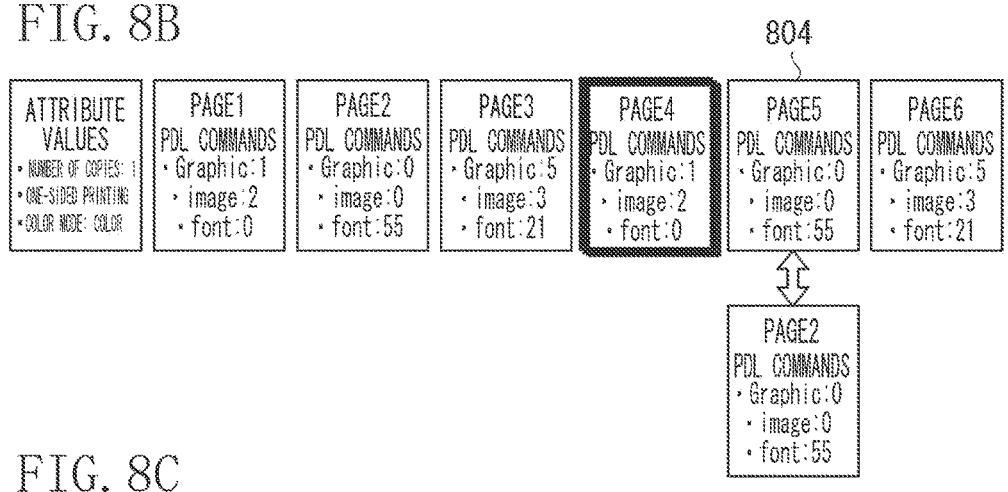
Figure 8C:
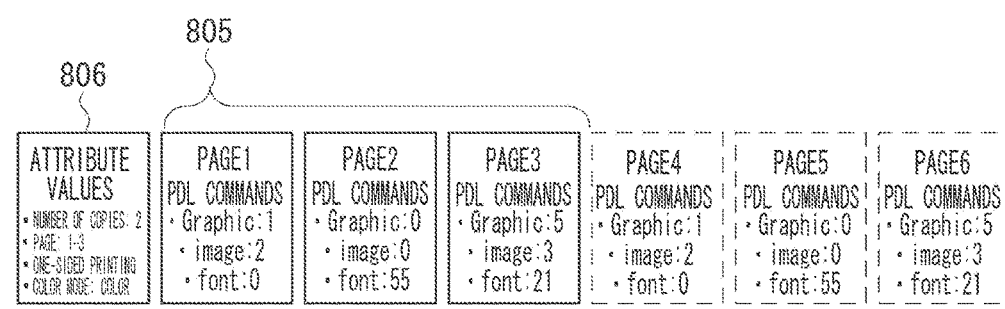

FIG. 7 (7A and 7B) is a flowchart illustrating an example of information processing performed by the PDL data analysis unit 304 to analyze the PDL data area 401 of the print data in step S505. FIGS. 8A, 8B, and 8C illustrate processing performed by the PDL data analysis unit 304 to determine a break of copies in each step illustrated in FIG. 7 (7A and 7B).

In steps S700 to S707, the PDL data analysis unit 304 determines a break of copies in the simple mode. In the simple mode, the PDL data analysis unit 304 determines whether there is a same page as a page number 1 802 based on the total numbers of respective PDL commands in the PDL command data 403 for each page in the print data acquired in step S504. In the simple mode, the PDL data analysis unit 304 can detect a page as a first break of copies.

In step S700, the PDL data analysis unit 304 stores, as values, each of a page number (N) to be compared with page number 1, a matching count (G), and information of a matched page (M[G]). The initial value of the comparison page number N is 2, and the initial value of the matching count G is 1.

In step S701, the PDL data analysis unit 304 determines whether the comparison page number N is smaller than the last page number. When the PDL data analysis unit 304 determines that the comparison page number N is smaller than the last page number (YES in step S701), the processing proceeds to step S702. On the other hand, when the PDL data analysis unit 304 determines that the comparison page number N is equal to the last page number (NO in step S701), i.e., the comparison processing is completed for all of N pages, the processing proceeds to step S707.

In step S702, the PDL data analysis unit 304 compares the numbers of respective PDL commands between the page number 1 and the page number N. In step S703, as illustrated in FIG. 8A, the PDL data analysis unit 304 determines whether the numbers of respective PDL commands (one graphic command, two image commands, and no font command) 801 of the page number 1 match with those of the comparison page number N.

When the PDL data analysis unit 304 determines that the numbers of respective PDL commands of the page number 1 match with those of the comparison page number N (YES in step S703), the processing proceeds to step S704. On the other hand, when the PDL data analysis unit 304 determines that the numbers of respective PDL commands of the page number 1 do not match with those of the comparison page number N (NO in step S703), the processing proceeds to step S706.

In step S704, the PDL data analysis unit 304 stores a page number of the matched page (M[G]=N) assuming that the comparison page number N as a break of copies. Referring to FIG. 8A, when the page number 1 is compared with a page number 4, the numbers of respective PDL commands match between them. Thus, the PDL data analysis unit 304 stores the page number of the page number 4 as the first matched page.

In step S705, the PDL data analysis unit 304 updates the matching count G (G+1) for the PDL command data.

In step S706, the PDL data analysis unit 304 increments the page number of the comparison page number (N+1), i.e., the page number of the page to be compared with the page number 1. Subsequently, the PDL data analysis unit 304 performs the PDL command data comparison processing (steps S701 to S706) on all pages.

In step S707, the PDL data analysis unit 304 determines whether there is a page having the same numbers of respective PDL commands as those of the page number 1 (G>1) in the simple mode. When there is a page having the same numbers of respective PDL commands as those of the page number 1 (G>1) (YES in step S707), the processing proceeds to step S708. On the other hand, when the PDL data analysis unit 304 does not detect a page having the same numbers of respective PDL commands as those of the page number 1 (NO in step S707), i.e., a break of copies is not found, the PDL data analysis unit 304 does not update the attribute values. Then, the processing exits this flowchart. The processing in step S707 is an example of processing for determining whether a page identical to the page number 1 is found among the page number 2 and subsequent pages.

Processing performed by the PDL data analysis unit 304 to determine whether pages forming a copy are continuous in the detailed mode in steps S708 to S712 will be described below with reference to FIG. 8B. In the detailed mode, the PDL data analysis unit 304 confirms in more detail the break of copies determined in the simple mode. The PDL data analysis unit 304 determines whether intermediate pages in the print data continuously have the same PDL command data as the page numbers 1 and 2. The detailed mode enables the PDL data analysis unit 304 to more correctly determine whether a break of copies exists.

In step S708, the PDL data analysis unit 304 starts processing from the page (M[K]) detected first (K=1) in the simple mode. Referring to FIG. 8A, the page number 4 803 corresponds to the page detected first. In step S709, the PDL data analysis unit 304 determines whether the comparison processing is completed for all of the matched pages detected (K=G) in the simple mode. When the PDL data analysis unit 304 determines that the comparison processing is completed for all of the matched pages detected (K=G) (YES in step S709), i.e., continuous matched pages are not found, the PDL data analysis unit 304 does not update the number of copies in the attribute values. Then, the processing exits the flowchart. On the other hand, when the PDL data analysis unit 304 determines that the comparison processing is not completed for all of the detected matched pages (NO in step S709), the processing proceeds to step S710.

In step S710, the PDL data analysis unit 304 compares the numbers of respective PDL commands between the page number 2 and the page following the matched page (M[K]+1) detected in the simple mode. The PDL data analysis unit 304 determines whether the numbers of respective PDL commands match between them for continuous pages (for example, page number 1 and page number 2) to confirm whether a plurality of pages is identical. Referring to FIG. 8B, a page number 5 804 next to the detected matched page number 4 803 corresponds to the page following the matched page. When the PDL data analysis unit 304 determines that the numbers of respective PDL commands match between the page number 2 and the comparison page number (M[K]+1) (YES in step S710), the processing proceeds to step S712. On the other hand, when the PDL data analysis unit 304 determines that the numbers of respective PDL commands do not match between the page number 2 and the comparison page number (M[K]+1) (NO in step S710), the processing proceeds to step S711. Referring to FIG. 8B, since the numbers of respective commands in the PDL command data match between the page number 2 and the page number 5, the PDL data analysis unit 304 determines that there is a continuity (YES in step S710), and the processing proceeds to step S712.

In step S711, the PDL data analysis unit 304 updates the page to be compared with page number 2 (K+1) to the next detected page, and the processing proceeds to step S709.

In step S712, the PDL data analysis unit 304 determines whether the number of pages for one copy 805 is a divisor of the total number of pages assuming that the number of pages for the one copy 805 equals the number of pages from the page number 1 to the detected page number (M[K]−1). When the PDL data analysis unit 304 determines that the number of pages for the one copy 805 is a divisor of the total number of pages (YES in step S712), the processing proceeds to step S713. On the other hand, when the PDL data analysis unit 304 determines that the number of pages for the one copy 805 is not a divisor of the total number of pages (NO in step S712), the PDL data analysis unit 304 determines that a break of copies does not exist, and does not update the number of copies in the attribute values. Referring to FIG. 8C, the PDL data analysis unit 304 determines that one copy ranges from the page number 1 to a page number 3. Since the number of pages for the one copy 805 is 3, the PDL data analysis unit 304 determines that the number is a divisor of the total number of pages 801 (6 pages) (YES in step S712), and the processing proceeds to step S713.

In step S713, the PDL data analysis unit 304 updates the specified number of copies in the attribute values to a divisor obtained from the number of pages for one copy (a break of copies) and the total number of pages. Referring to FIG. 8C, since the total number of pages is twice the number of pages for the one copy, the PDL data analysis unit 304 changes the number of copies in attribute values 806 to 2. Further, since the one copy ranges from the page number 1 to the page number 3, the PDL data analysis unit 304 registers information of the range from the page number 1 to the page number 3 as information about the number of copies in the attribute values 806.

Figure 6:
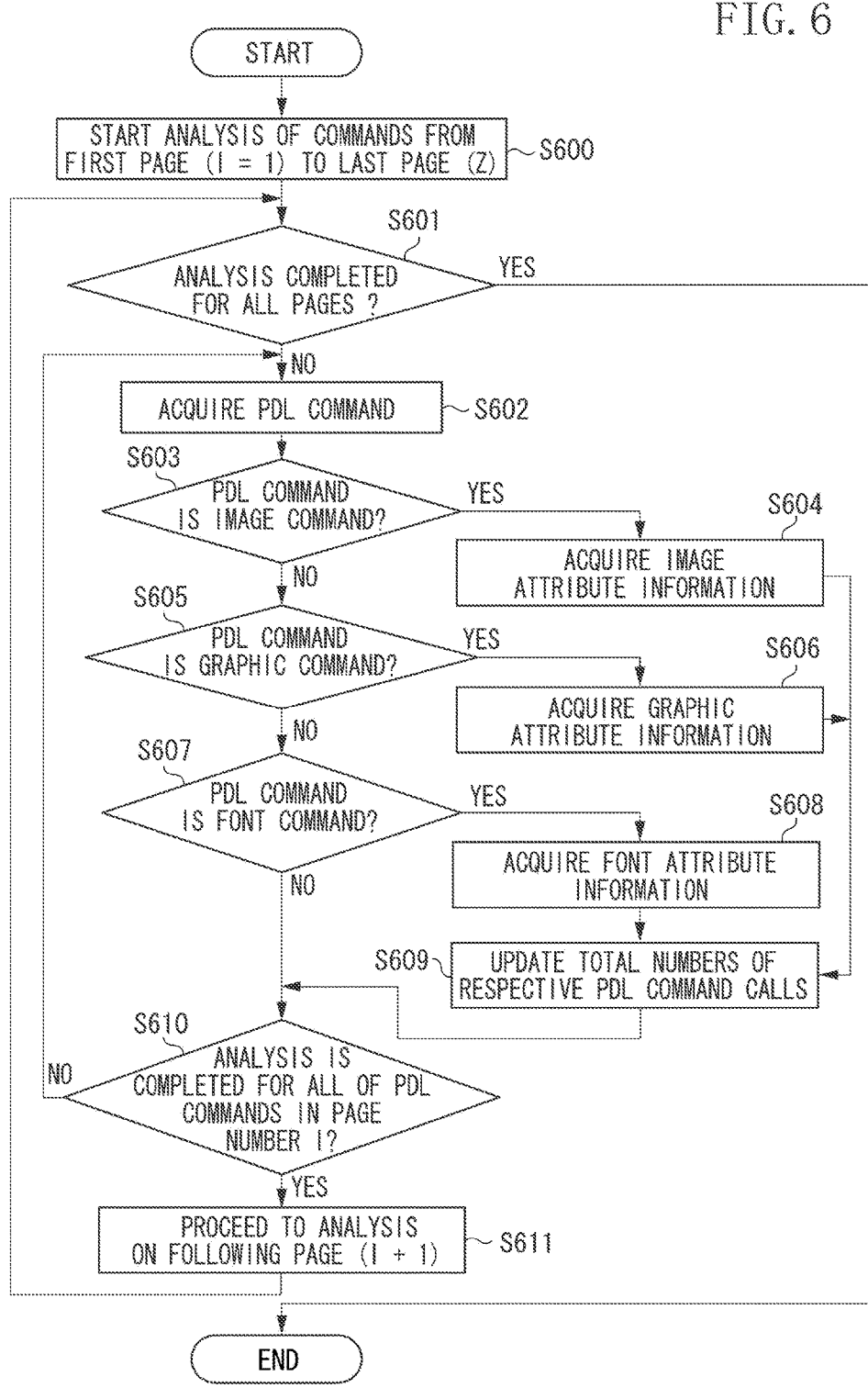
FIG. 6 is a flowchart illustrating an example of processing for acquiring statistical information.

In the descriptions of the first exemplary embodiment with reference to FIGS. 5, 6, 7 (7A and 7B), 8A, 8B, and 8C, the PDL data analysis unit 304 compares the numbers of respective PDL commands in the PDL command data. However, the comparison target is not limited to the numbers of respective PDL commands. For example, the PDL data analysis unit 304 may compare the total data size for each page. Further, the PDL data analysis unit 304 may strictly compare every word of PDL commands on a command basis. In this case, the PDL data analysis unit 304 may set a conditional number for command matching, for example, a fixed threshold value for the number of data items in the PDL command data used to determine command matching. In any case, only the comparison target data changes for each page illustrated in FIGS. 7 (7A and 7B), 8A, 8B, and 8C, and the method for detecting a break of copies remains unchanged.

The first exemplary embodiment has been described above based on a method for detecting the number of copies when a plurality of copies is specified on a non-collate basis in the print data subjected to reservation printing. Even when the image forming apparatus 100 receives an operation for editing print data from the user via the operation unit 102, the number of copies of the print data has been updated. In this case, therefore, printing can be made without performing useless printing when the user changes the number of copies.

<Method for Determining a Break of Copies by Using Preview Image Data>

Figure 9:
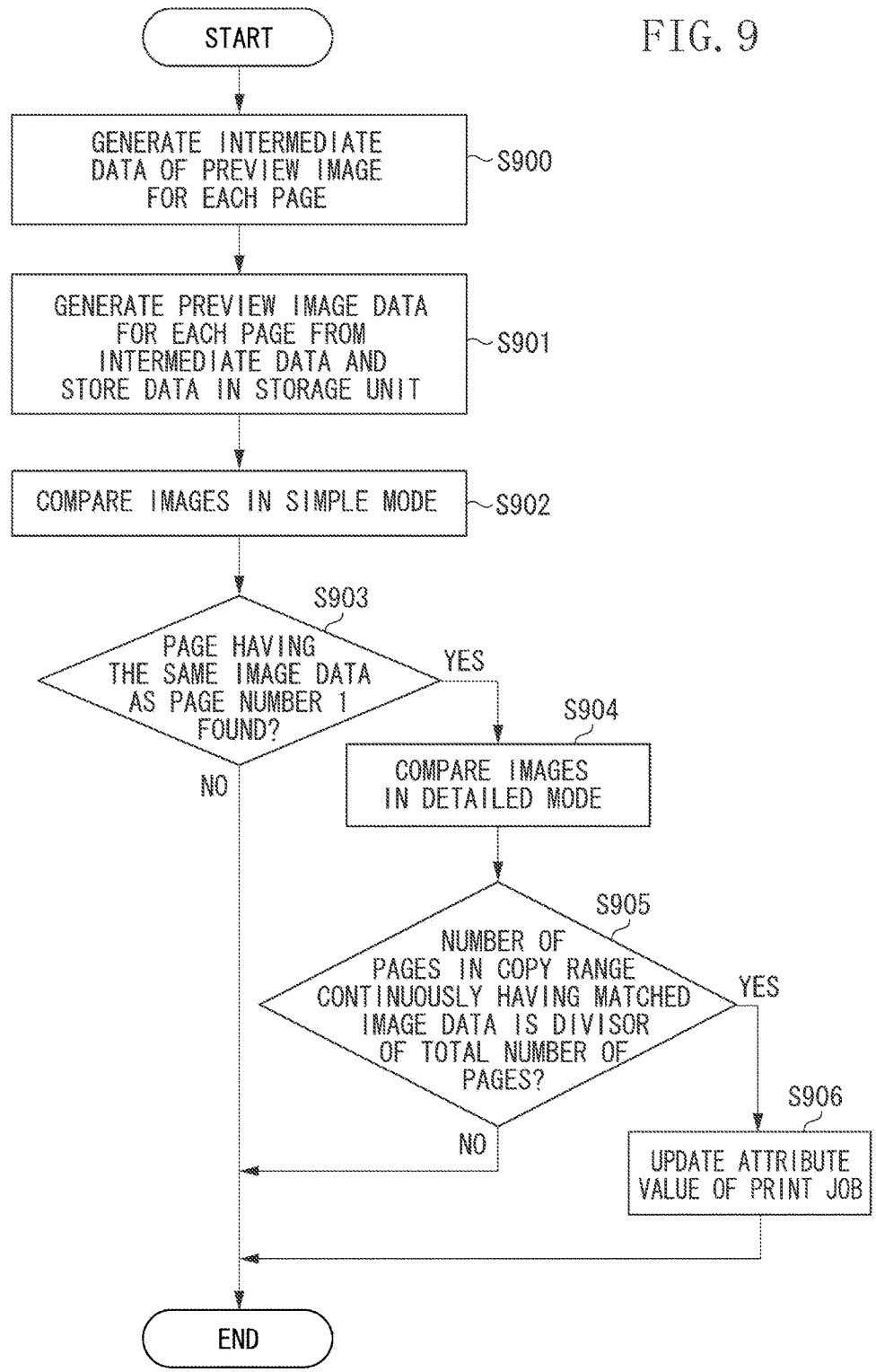
FIG. 9 is a flowchart illustrating an example of information processing according to a second exemplary embodiment.

A second exemplary embodiment of the present invention will be described below. FIG. 9 is a flowchart illustrating an example of information processing for determining a break of copies by using preview image data generated by the data drawing unit 305. Comparison target image data is not limited to the preview image data, and may be thumbnail image data, reduced image data, and bitmap data for image processing.

In step S900, the PDL data analysis unit 304 analyzes the PDL command data 403, and generates intermediate data in the document storage unit 307.

In step S901, the data drawing unit 305 generates preview image data for each page based on the intermediate data stored in the document storage unit 307. Then, the data drawing unit 305 stores the generated preview image data in the document storage unit 307.

In step S902, the image processing unit 308 compares the preview image data between page number 1 and each of other pages in the simple mode. The image comparison processing in step S902 illustrated in FIG. 9 in the simple mode is similar to the processing in steps S701 to S706 illustrated in FIG. 7 (7A and 7B) except that the comparison target data is the preview image data, and redundant descriptions thereof will be omitted.

In step S903, the image processing unit 308 determines whether a page having the same image data as page number 1 is found. When the image processing unit 308 determines that a page having the same image is found (YES in step S903), the processing proceeds to step S904. On the other hand, when the image processing unit 308 determines that a page having the same image is not found (NO in step S903), i.e., a break of copies does not exist, the image processing unit 308 does not change the attribute value. Then, the processing exits this flowchart. The processing in step S903 is an example of processing for determining whether any of page number 2 and subsequent pages is identical to page number 1.

In step S904, the image processing unit 308 compares bitmap images in continuous pages in the detailed mode. The image comparison processing in step S904 illustrated in FIG. 9 in the detailed mode is similar to the processing in steps S708 to S711 illustrated in FIG. 7 (7A and 7B) except that the comparison target data is the preview image data, and redundant descriptions thereof will be omitted.

In step S905, the image processing unit 308 determines whether the number of pages in a copy range continuously having matched image data is a divisor of the total number of pages. When this number of pages is a divisor of the total number of pages (YES in step S905), the processing proceeds to step S906. On the other hand, when this number of pages is not a divisor of the total number of pages (NO in step S905), the image processing unit 308 does not change the attribute value. Then, the processing exits this flowchart. The method for determining the number of pages for one copy, performed by the image processing unit 308 in step S905, has been described above with reference to step S712 illustrated in FIG. 7 (7A and 7B), and redundant descriptions thereof will be omitted.

In step S906, the image processing unit 308 updates the number of copies and the page range determined in step S905 in the attribute values. The image processing unit 308 stores the updated attribute values in the document storage unit 307 together with the preview image for each page.

The second exemplary embodiment has been described above centering on a method for determining a break of copies by comparing image data generated for previewing the print data subjected to reservation printing. This method performs comparison on a pixel basis, not based on the PDL command data as in the first exemplary embodiment, enabling data-independent copy search with higher accuracy.

Aspects of the present invention can also be achieved when a program for implementing at least one of the above-described functions of the exemplary embodiments is supplied to a system or apparatus via a network or storage medium, and at least one processor in a computer of the system or apparatus reads and executes the program. Aspects of the present invention can also be achieved by a circuit (for example, an application specific integrated circuit (ASIC)) for implementing at least one of the above-described functions.

While aspects of the present invention have specifically been described in detail based on the above-described exemplary embodiments, the aspects of the present invention are not limited thereto.

According to the processing in the above-described exemplary embodiments, by automatically determining a break of copies based on the content of print data, it becomes possible, on an image forming apparatus, to correctly change the number of copies for the entire print data processed by applications and printer drivers on a PC.

According to aspects of the present invention, it becomes possible for a user to change settings as desired even for print data for reservation printing to which the number of pages for one copy is not added as an attribute value.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-102833, filed May 20, 2015, which is hereby incorporated by reference herein in its entirety.

What is claimed is:
1. An image forming apparatus being capable of acquiring print data comprising:
an image forming device configured to form an image on a sheet;
an accepting device configured to accept a user operation; and a controller having a processor that executes instructions stored in a memory, configured to:

acquire print data for a plurality of pages, the print data including a plurality of sets of print commands;

specify a page including print commands that matches print commands included in a top page in the acquired print data, wherein one or more pages preceding to the specified page are identified as a page group including a set of print commands of the plurality of sets of print commands;

accept, via the accepting device, a specification of a number of times image forming for the page group is to be repeatedly performed; and cause the image forming device to perform an image forming according to the set of print commands the specified number of times repeatedly.

2. The image forming apparatus according to claim 1, wherein the print data including the print commands described by using page description language, the print commands included in the top page is print commands that describes one or more images to be printed on the top page, and the print commands included in the specified page is print commands that describes one or more images to be printed on the specified page.

3. The image forming apparatus according to claim 2, wherein the page including print commands that matches print commands included in the top page is specified based on information about the number of commands included in the top page, and information about the number of commands included in another page.

4. The image forming apparatus according to claim 2, wherein the information about the number of commands included in the top page and the information about the number of commands included in the another page are information about number of at least one of a graphic command, an image command and a font command.

5. The image forming apparatus according to claim 2, wherein the page including print commands that matches print commands included in the top page is specified based on information about a data size of an object indicated by the commands included in the top page, and information about a data size of an object indicated by the commands included in another page.

6. The image forming apparatus according to claim 1, wherein the controller further compares information about a page next to the top page with information about a page next to the specified page.

7. The image forming apparatus according to claim 1, wherein the acquired print data is print data in which information of the number of copies is not provided in advance.

8. The image forming apparatus according to claim 1, wherein the controller, after comparing information about the command configuring the top page with information about another page, compares the information about top page image data generated based on the command of the top page with the information about another page image data generated based on the command of the another page.

9. The image forming apparatus according to claim 1, wherein in a case where the print data is repetition data, the controller sets the number of repetitions of the page group as an initial value of the number of copies.

10. The image forming apparatus according to claim 1, wherein the accepting device has a display that is operable by a user, wherein the controller accepts specification of the number of copies for printing via a user interface displayed on the display.

11. A method for controlling the image forming apparatus using an image forming device configured to form an image on a sheet and an accepting device configured to accept a user operation, the method comprising:

acquiring print data for a plurality of pages, the print data including a plurality of sets of print commands;

specifying a page including print commands that matches print commands included in a top page in the acquired print data, wherein one or more pages preceding to the specified page are identified as a page group including a set of print commands of the plurality of sets of print commands;

accept, via the accepting device, a specification of a number of times image forming for the page group is to be repeatedly performed; and causing the image forming device to perform an image forming according to the set of print commands the specified number of times repeatedly.

* * * * *